June 16, 1942.　　　J. M. SIMPSON　　　2,286,585
CLUTCH CONTROL
Filed Sept. 18, 1940　　　2 Sheets-Sheet 1

Inventor:
John M. Simpson
By: Edward C. Gritzbaugh
Atty.

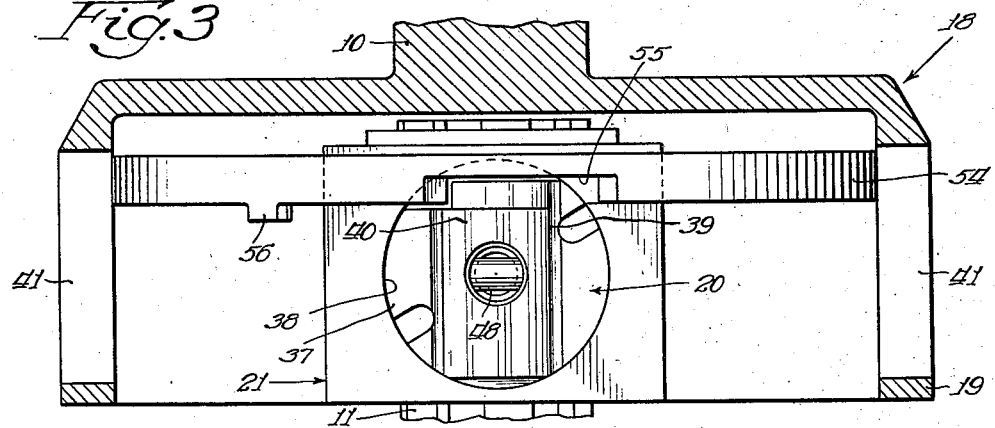
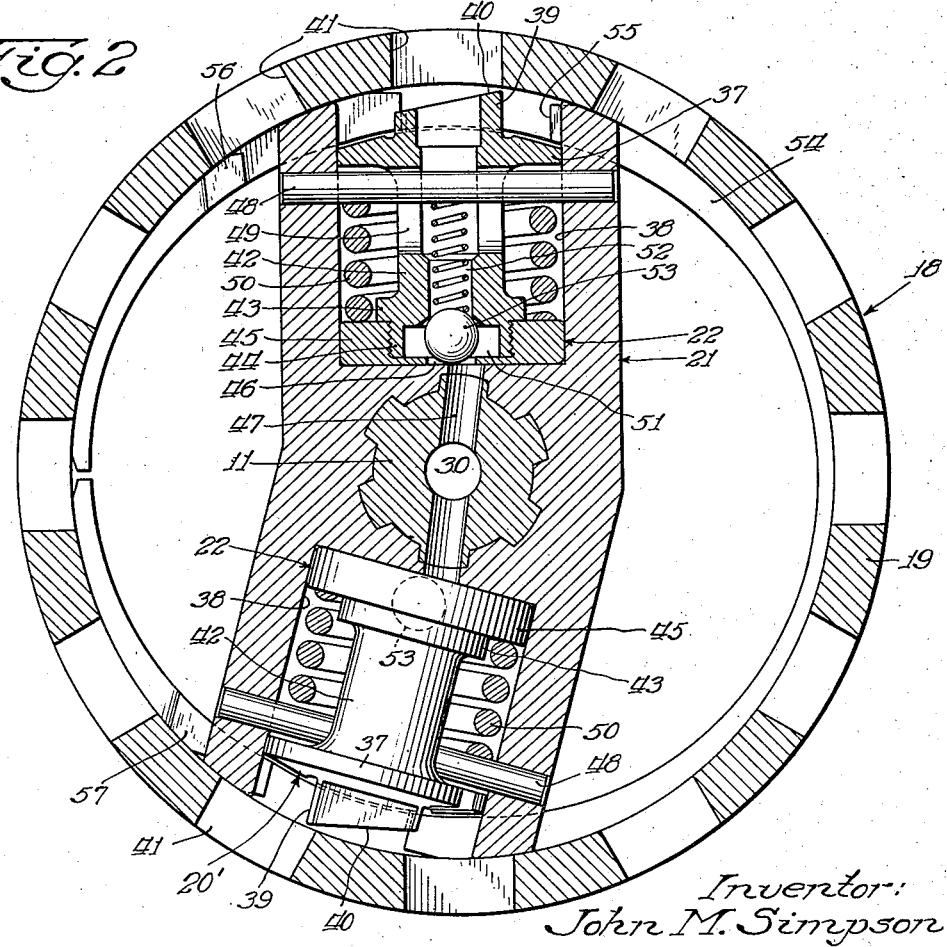

Patented June 16, 1942

2,286,585

UNITED STATES PATENT OFFICE 2,286,585

CLUTCH CONTROL

John M. Simpson, Muncie, Ind., assignor to Borg-Warner Corporation, Chicago, Ill., a corporation of Illinois Application September 18, 1940, Serial No. 357,220

21 Claims. (Cl. 192—85)

This invention relates to positive clutches and to a means for controlling the operation of such a clutch.

The invention is particularly adapted for use with radially operating positive clutches and will be described with particular reference to such an embodiment.

There has been developed a positive clutch of the radial type which is operated by centrifugal force, the radially movable bolts serving as their own governor. This clutch is disclosed in Keller Patent No. 1,969,561 and comprises in one form a windowed drum secured to a driving shaft, and a bolt carrier secured to a driven shaft, the bolts being designed to move outward in response to centrifugal force against the action of restraining springs. The ends of the bolts are chamfered so that engagement does not occur until there is a reversal of torque, although the bolts are in position to engage and ratchet over the windows while there is relative rotation between the driving and driven shafts. This form of clutch is well suited to a system wherein the clutch is to be engaged at relatively high speed since centrifugal force varies as the square of the speed.

In some instances the positive action of the radial clutch just described together with its axial compactness are highly desirable, but the speed at which operation is required is so low that the clutch elements would be prohibitively large. Thus, for example, it has been proposed to use a hydrodynamic torque converter for transmitting and multiplying torque from an automobile engine to the rear wheels instead of the usual gear transmission, but in view of the inefficiency of such converters at speeds above say fifteen miles per hour, the driving and driven elements of the converter must be locked together above this speed to provide a positive drive for increased efficiency. In order to get quick, positive action at this speed through centrifugal force, the size of the bolts would be prohibitive. In order to use practical-sized bolts it becomes necessary to assist centrifugal force by some suitable additional power at the time engagement is desired.

The object of the invention therefore is to provide a positive type of clutch for connecting driving and driven elements wherein radially slidable bolts are used which are moved outwardly by positive pressure to engage a slotted or windowed element at a relatively low rotative speed.

It has been found that when positive pressure is used to engage a bolt with a window at low speeds, the bolt strikes the edges of the windows with considerable force while there is relative rotation between the bolt and windows which results in a damaged windowed shell and an unpleasant noise.

Another object of this invention thus is to provide means for preventing engagement of the clutch except at such times as the driving and driven members are rotating at substantially the same speed.

Since clutches of the Keller type do not necessarily engage precisely at the instant of synchronization but only upon a slight reversal of torque which brings a bolt in radial alignment with a window, it is desirable to have as many windows as possible to decrease the amount of reverse rotation required to align the bolt and a window. A decrease in the amount of reverse rotation decreases the time required for engagement and also decreases the shock occasioned by the engagement when it does occur. Practical considerations however, limit the number of windows that it is desirable to use.

Yet another object of this invention is to provide a positive clutch of the radially movable bolt type wherein a windowed shell is used having an even number of windows and a plurality of bolts are provided, the bolts being arranged in such a manner that when one bolt is aligned with an opening or window in the shell the other bolts are located at points between adjacent windows whereby in effect to multiply the number of windows. Other objects and the features of this invention will become apparent from the description which follows.

The preferred embodiment of the invention is shown in the accompanying drawings wherein:

Fig. 2 is an enlarged front elevation in section of the clutch;

Fig. 3 is a plan view of the clutch of Fig. 2 with the shell cut away to show the bolt and novel blocking mechanism;

In its preferred form this invention comprises radially slidable bolts which are normally held retracted by coil springs and are moved outwardly by means of fluid under pressure. The bolts are constructed to resemble pistons at their inner ends and are slidable in cylindrical bores in a carrier drivingly connected to either the driving or driven shaft. The bolts are provided with a cam surface which assists in engaging a bolt with an aligned window in a windowed element connected to the other shaft.

Two bolts are disclosed cooperating with the windowed element, the bolts being so spaced circumferentially that when one bolt is aligned with a window, the other bolt is located halfway between adjacent windows, so that relative rotation between the bolt carrier and the windowed element of one half the angle between adjacent windows will cause one or the other of the bolts to be aligned with a window. This has the effect of doubling the number of windows.

Since the bolts are engaged under fluid pressure there is a relatively large force tending to engage the clutch. If this occurs while there is relative rotation between the driving and driven elements the bolts will hammer the edges of the windows and will soon render the clutch unsatisfactory unless some means for preventing this hammering action is used. In the invention disclosed a blocking element is provided which is oscillatable across the path of movement of the bolts from a blocking position, in which the bolt is held away from the windows, to an unblocking position in which the bolt is free to move radially outwardly to engage a window. The oscillation of the blocker occurs as the result of a frictional drag between the blocking element and the windowed shell. Thus when the windowed shell is rotating faster than the bolts, the force of friction will move the blocker to a blocking position, and when the rotation of the driving and driven elements is synchronized and then passes slightly to an asynchronous condition in the opposite sense, the blocking element is moved in the opposite direction to permit the bolt to move radially outwardly into engaging position.

Figure 1:
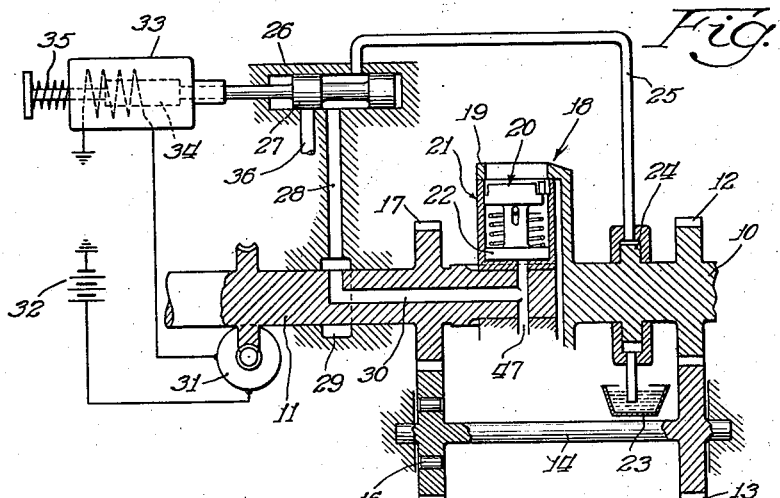
Fig. 1 is a schematic assembly drawing showing a section through the clutch and associated control mechanism.

Referring now to the drawings for a detailed description of the invention attention is first directed to Fig. 1, wherein is shown a drive shaft 10 which is to be coupled to a driven shaft 11 for the transmission of torque thereto. Drive shaft 10 is connected to a prime mover (not shown) and driven shaft 11 is connected to a load (not shown). In the embodiment shown, a torque transmitting path is provided comprising a drive gear 12 meshing with a driven gear 13 on a countershaft 14 which in turn drives a gear 15 through an overrunning clutch 16. Said gear 15 meshes with a gear 17 drivingly connected to driven shaft 11. This torque transmitting path may be one wherein the torque is multiplied and the speed reduced. It is understood that this torque transmitting path may include or constitute a hydro-dynamic device or a hydraulic displacement device as well.

The positive clutch of this invention is shown at 18 and is used to by-pass the first torque transmitting path in order to couple driving shaft 10 directly to driven shaft 11 for direct drive.

Clutch 18 is comprised of a windowed shell 19 drivingly secured to drive shaft 10, and radially slidable bolts 20 (only one of which is shown in Fig. 1) mounted in a carrier 21 drivingly connected to driven shaft 11. The inner end 22 of bolt 20 is in the form of a piston which is operated by fluid pressure. In the embodiment shown the pressure is derived from a reservoir 23 of oil or the like from which the oil is drawn by means of a pump 24 driven by drive shaft 10, and thence under pressure through a conduit 25 to a valve block 26 wherein is located a piston type valve 27. Said valve 27 is slidable to allow fluid under pressure to enter conduit 28 leading to a manifold 29 surrounding driven shaft 11, and from this point the oil is passed through a conduit 30 in driven shaft 11 to pistons 22.

The movement of valve 27 is controlled by means of a governor 31 driven from driven shaft 11, said governor being of the electrical type which controls a circuit from a battery 32 or other source of electrical energy to a solenoid 33. Said solenoid 33, when energized, moves an armature 34, directly connected to valve 27, to the right (Fig. 1) to allow fluid to enter conduit 28. When solenoid 33 is de-energized, a spring 35 pulls valve 27 to the left (Fig. 1) to block conduit 25 containing oil under pressure, and to allow the oil behind pistons 22 to escape through conduit 30, manifold 29, conduit 28 and exhaust conduit 36 uncovered by the leftward movement of valve 27.

Figures 4, 5:
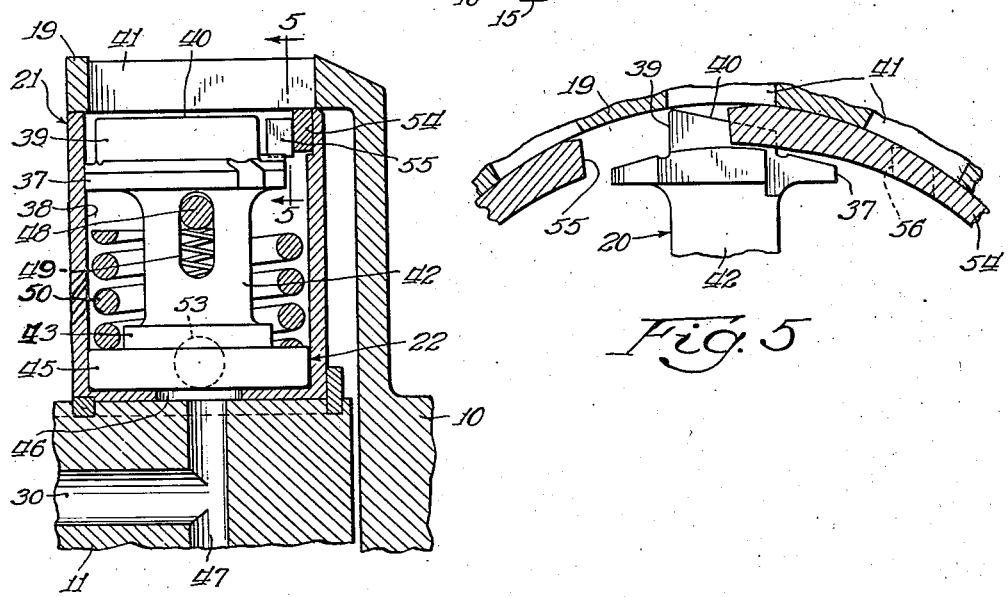
Fig. 4 is an enlarged fragmentary side elevation in section through the clutch.
Fig. 5 is a fragmentary front elevation of the bolt showing the blocking mechanism in its operative position.

Referring now to Figs. 2, 3 and 4 for the details of construction of the positive clutch, bolt 20 is comprised of a piston 37 which is received in a cylindrical bore 38 in carrier 21. The outer end 39 is in the form of a rectangular projection having a cam surface 40 which permits the bolt to enter more readily one of the windows 41 in shell 18. Cylinder 37 has a portion 42 of reduced diameter adjacent thereto which terminates in a shoulder 43 and a threaded portion 44 at the inner end thereof. Threaded on portion 44 is a cylindrical washer 45 which constitutes the piston portion of the bolt. Said washer 45 has an aperture 46 in communication with a radial passageway 47 which connects with conduit 30 in driven shaft 11. A transverse pin 48 passes through a radial slot 49 in reduced portion 42 of the bolt. A compression spring 50 is retained between pin 48 and washer 45 and serves to maintain bolt 20 in its retracted position. Fluid under pressure is conducted through radial passageway 47 and aperture 46 into a chamber 51 within threaded portion 44 to initiate the movement of the bolt, and as soon as the bolt has moved slightly the fluid passes behind washer 45 thereby increasing the total pressure available to move the bolt. Any fluid that escapes past washer 45 is returned through slot 49 and a central passageway 52 past a ball check valve 53 which normally closes off passageway 52. The dimensions of the parts are such that when the bolt 20 is completely withdrawn in its cylinder 38, the ball 53 is but slightly off its seat. The opening amounts to only a few thousandths. It will be observed that ball 53 is located immediately above the oil inlet passage 47 and directly in the path of the stream of oil which when the valve is open to permit the oil under pressure to come through the passage, comes in with sufficient force to carry the ball up against its tapered seat. The spring which holds the ball down is very light and practically any oil pressure at all is sufficient to keep the ball against its seat. The ball does not function to let the oil out of the intermediate portion of the piston until the pressure in the line has been cut off entirely.

Opposite bolt 20 is a second bolt 20' which is angularly displaced with respect to the axis of bolt 20. It will be observed that shell 18 is pro- 'vided with an even number of windows 41. The angular displacement of bolt 20' is such that its axis will lie midway between adjacent windows 41 when bolt 20 is axially aligned with a window. By this disposition of bolts it is merely necessary to rotate carrier 21 with respect to shell 18 an angular distance equal to one half the angle between adjacent windows to get one bolt aligned with a window. If the bolts were spaced 180° apart the relative angular movement between carrier 21 and shell 18 would have to be the full distance between adjacent windows. The angular displacement of the bolts thus has the effect of doubling the number of windows in the shell and thereby reducing the amount of overtravel and the time required to effect engagement of the clutch.

Since the bolts are moved outwardly by fluid pressure, relative movement between the bolts and windowed shell causes cam surface 40 to strike the corners of the windows with considerable force. This causes an unpleasant noise and also destroys the corners. To avoid a premature entry of a bolt into a window and the undesirable consequences just described, means are provided for preventing the bolts from moving outward until carrier 21 and shell 18 are rotating substantially in synchronism. This means comprises an oversized oscillatable split ring 54 which is inserted between carrier 21 and shell 18 and bears frictionally upon the inner surface of shell 18 through its own resilience. Said ring 54 is provided with a lateral slot 55 for each bolt, the slot being wider than the circumferential dimension of the bolt. As shown in Fig. 4, both carrier 21 and the bolts 20 and 20' are cut away to receive ring 54. Slots 55 are so arranged that when ring 54 is rotated clockwise as shown in Fig. 2 through a small angle the slot 55 will not be aligned with the bolts and the ring therefore will block radial outward movement of the bolts. When ring 54 is rotated relative to carrier 21 through a slight angle in the opposite direction the slot will be aligned with the bolts and the latter will then be able to pass on outward into a window. Thus spring 54, by a proper oscillating movement may either block the bolts or permit them to pass outward into engagement with shell 18. The oscillating movement is limited by abutments 56 and 57 on the ring which cooperate with carrier 21.

Since ring 54 is resilient and bears continuously upon the inner surface of shell 18, the frictional force developed between the shell and ring will tend to carry the ring with the shell. If the shell is rotating clockwise as shown in Fig. 2 at a greater speed than carrier 21, ring 54 will be carried with it and will rotate with respect to carrier 21 to a blocking position. If shell 18 however, is slowed down to a point where it reaches synchronism with respect to carrier 21 and then passes slightly beyond synchronism to a condition of asynchronism, that is, a point where shell 18 begins to rotate more slowly than carrier 21, ring 54 will be carried with it and will rotate in the opposite direction to align slots 55 with the bolts and thereby permit them to enter a window.

The non-blocking position of ring 54 is shown in Fig. 2 and the blocking position is shown in Fig. 5. It will be noted that although both bolts 20 and 20' are free to move radially outward at the same time, only one will engage a window since the other, because of the angular displacement between bolts, is not aligned with a window.

The operation of the fluid system and control therefor, the bolts themselves and the blocking mechanism have been detailed elsewhere in connection with the description of these several organizations, and accordingly will not be repeated here. Obviously the driving and driven shafts may be interchanged insofar as the clutch elements are concerned and other means for driving the driven shaft from the drive shaft may be used instead of the gear train shown. It is understood therefore that this invention is not to be limited to the embodiment illustrated but its scope is to be determined by the appended claims.

I claim:

1. A positive clutch for transmitting torque from a driving element to a driven element comprising a member having radial bores driven by one of said elements, radially movable pistons in said bores, bolts movable with said pistons, a windowed shell drivingly connected to the other element, said windows being axially aligned with said bolts and adapted to receive the bolts for connecting the elements together, a source of fluid under pressure, means for conducting the fluid under pressure to the pistons, a valve for controlling the fluid, means normally restraining radial movement of the bolts and means responsive to a predetermined speed of one of the elements for operating the valve to admit fluid behind the pistons to overcome the restraining means and engage the clutch.

2. A positive clutch as in claim 1, the restraining means comprising resilient elements acting to hold the pistons in retracted position against a moderate amount of centrifugal force and said valve operating means becoming effective while the centrifugal force is still insufficient to overcome the restraining means.

3. A positive clutch for transmitting torque from a driving element to a driven element comprising a windowed shell driven by the driving element, a plurality of bolts, a carrier for the bolts drivingly connected to the driven element, one of said bolts being adapted to enter one of the windows to engage the clutch, a source of fluid, a pump connected to the driving shaft for creating a pressure in the fluid, resilient means normally restraining radially outward movement of the bolts, cylinder and piston means for moving the bolts radially outward against the action of the resilient means, conduits connecting the fluid under pressure with the cylinder means, a valve interposed in the conduits for controlling the flow of fluid into and out of the cylinder means, a governor on the driven shaft, and means controlled by the governor for controlling the operation of said valve.

4. A positive clutch for transmitting torque from a driving element to a driven element comprising a movable bolt, a carrier for the bolt drivingly associated with one of said elements, and a slotted member drivingly associated with the other element, said bolt being adapted to move into a slot to engage the clutch and comprising spaced cylindrical portions connected by a portion of reduced cross-section, a cam surface on the bolt for controlling the engagement of the bolt, and means associated with the portion of reduced cross section and rigidly connected to the carrier for preventing the bolt from rotating with respect to the carrier, whereby to maintain the cam surface in a predetermined position with respect to the slotted member.

5. A positive clutch as described in claim 4, said means associated with the portion of reduced cross-section comprising a pin rigidly secured to the carrier, and said portion of reduced cross-section having a slot through which the pin passes.

6. A positive clutch for transmitting torque from a driving element to a driven element comprising a movable bolt, a carrier for the bolt drivingly associated with one of said elements, and a slotted member drivingly associated with the other element, said bolt comprising spaced cylindrical portions connected by a portion of reduced cross-section, an abutment on the carrier extending between the cylindrical portions, and resilient means operating between the abutment and one of the cylindrical portions to hold the bolt in retracted position.

7. A positive clutch as described in claim 6, said bolt having a cam surface for controlling the engagement of the bolt with the slotted member, said reduced portion being slotted and said abutment comprising a pin rigidly secured to the carrier and passing through the slot to prevent the bolt from turning.

8. A positive clutch for transmitting torque from a driving element to a driven element, comprising a slidable bolt, a carrier for the bolt drivingly associated with one of said shafts, a slotted member drivingly associated with the other member and adapted to receive the bolt in one of the slots for coupling the driving and driven elements, power means for urging the bolt toward a slot, and means resiliently held against the slotted member and capable of limited angular movement with respect to the carrier for blocking the bolt while the slotted element is rotating at a different speed than the carrier to prevent the engagement of the bolt with the slotted member during such time.

9. A positive clutch for transmitting torque from a driving element to a driven element comprising a bolt carried by one of the elements, a slotted member carried by the other element, the slots being adapted to receive the bolt to engage the clutch, power means for urging the bolt toward a slot, a stepped region on the bolt, means cooperating with the stepped region and frictionally bearing against the slotted member for preventing the bolt from entering a slot, said last named means being oscillatable from a blocking position, occurring when the slotted member rotates asynchronously with respect to the carrier, to a non-blocking position occurring when the slotted member passes through synchronism with the carrier and begins to rotate asynchronously therewith in the opposite sense.

10. A positive clutch for transmitting torque from a driving element to a driven element comprising a bolt, a carrier for the bolt rotatable with one of the elements, a slotted member carried by the other element, the slots being adapted to receive the bolt to engage the clutch, and means for preventing the bolt from entering a slot until the driving and driven elements are rotating at substantially the same speed, said means comprising a torque responsive element which is oscillatable across the path of the bolt from a blocking position occurring when the driving and driven elements are rotating asynchronously to a non-blocking position occurring when the driving and driven elements rotate synchronously and then pass to asynchronism in the opposite sense.

11. A positive clutch as described in claim 10, said torque responsive element comprising a resilient split ring bearing frictionally against the slotted members and having circumferentially spaced abutments which cooperate with the carrier to limit the oscillation of said element.

12. A positive clutch for transmitting torque from a driving element to a driven element comprising a windowed shell secured to one of the elements, said shell having an even number of windows, a plurality of bolts slidable toward the windows, and a carrier for the bolts secured to the other element, said carrier supporting the bolts at unequal angular spacings from one another, such that only one bolt is aligned with a window at a time.

13. A positive clutch for transmitting torque from a driving element to a driven element comprising a windowed shell secured to one of the elements, said shell having an even number of windows, a pair of bolts movable radially to enter the windows of the shell, and a carrier for the bolts secured to the other element, said carrier angularly disposing the bolts with respect to the windows in such a manner that when one bolt is aligned with a window the other bolt is disposed midway between windows.

14. A positive clutch as in claim 13, and a split ring bearing resiliently against the windowed shell and having a portion oscillatable across the paths of the bolts to block the movement of the bolts toward the windows, and abutments on the ring cooperating with the carrier for limiting the oscillating movement of the ring.

15. A positive clutch for transmitting torque from a driving element to a driven element comprising a member having radial bores driven by one of said elements, radially movable pistons in said bores, bolts movable with said pistons, a windowed shell drivingly connected to the other element, said windows being axially aligned with said bolts and adapted to receive the bolts for connecting the elements together, a source of fluid under pressure, means for conducting the fluid under pressure to the pistons, a valve for controlling the fluid, means normally restraining radial movement of the bolts and speed responsive means for operating the valve.

16. A positive clutch for transmitting torque from a driving element to a driven element comprising a windowed shell driven by the driving element, a plurality of bolts, a carrier for the bolts drivingly connected to the driven element, one of said bolts being adapted to enter one of the windows to engage the clutch, a source of fluid, a pump for creating a pressure in the fluid, resilient means normally restraining radially outward movement of the bolts, cylinder and piston means for moving the bolts radially outward against the action of the resilient means, conduits connecting the fluid under pressure with the cylinder means, a valve interposed in the conduits for controlling the flow of fluid into and out of the cylinder means, a governor, and means controlled by the governor for controlling the operation of said valve.

17. A positive clutch for transmitting torque from a driving element to a driven element, comprising a slidable bolt, a carrier for the bolt drivingly associated with one of said shafts, a slotted member drivingly associated with the other member and adapted to receive the bolt in one of the slots for coupling the driving and driven elements, and means resiliently held against the slotted member and capable of limited angular movement with respect to the carrier for blocking the bolt while the slotted element is rotating at a different speed than the carrier to prevent the engagement of the bolt with the slotted member during such time.

18. A positive clutch for transmitting torque from a driving element to a driven element comprising a bolt carried by one of the elements, a slotted member carried by the other element, the slots being adapted to receive the bolt to engage the clutch, a stepped region on the bolt, means cooperating with the stepped region and frictionally bearing against the slotted member for preventing the bolt from entering a slot, said last named means being oscillatable from a blocking position, occurring when the slotted member rotates asynchronously with respect to the carrier, to a non-blocking position occurring when the slotted member passes through synchronim with the carrier and begins to rotate asynchronously therewith in the opposite sense.

19. A positive clutch for transmitting torque from a driving element to a driven element comprising a radially movable bolt drivingly connected to one of the elements, a slotted member drivingly connected to the other element, the slots being aligned with and adapted to receive the bolt, means for restraining radial movement of the bolt below a predetermined speed of rotation of one of said elements, and power means for overcoming said restraining means to move the bolt radially to engage the clutch, said power means comprising a piston operatively associated with the bolt, means for building up pressure behind the piston, and speed-responsive control means for controlling the pressure building means.

20. A positive clutch for transmitting torque from a driving element to a driven element comprising a radially movable bolt drivingly connected to one of the elements, a slotted member drivingly connected to the other element, the slots being aligned with and adapted to receive the bolt, means for restraining radial movement of the bolt below a predetermined speed of rotation of one of said elements, and power means for overcoming said restraining means to move the bolt radially to engage the clutch, said power means comprising a piston operatively associated with the bolt, means for building up pressure behind the piston, and speed-responsive control means for controlling the pressure building means, said power means being superseded by centrifugal force above said predetermined speed to overcome the restraining means.

21. A positive clutch for transmitting torque from a driving element to a driven element comprising a radially movable bolt drivingly connected to one of the elements, said bolt having a cam surface on its outer end and substantially flat driving faces on either side of the cam surface, a slotted member drivingly connected to the other element, the slots being aligned with the bolt and adapted to cooperate with the flat driving surfaces thereof only upon a reversal of driving relations between the driving and driven elements to establish a driving connection therebetween, means for restraining radial movement of the bolt below a predetermined speed of rotation of one of said elements, and power means for overcoming said restraining means to move the bolt radially to engage the clutch.

JOHN M. SIMPSON.